US008970574B2

(12) United States Patent
Kim et al.

(10) Patent No.: US 8,970,574 B2
(45) Date of Patent: Mar. 3, 2015

(54) LIGHT EMITTING DISPLAY APPARATUS AND METHOD OF DRIVING THE SAME

(75) Inventors: Se-Ho Kim, Yongin (KR); Won-Kyu Kwak, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 800 days.

(21) Appl. No.: 12/694,491

(22) Filed: Jan. 27, 2010

(65) Prior Publication Data

US 2010/0201674 A1 Aug. 12, 2010

(30) Foreign Application Priority Data

Feb. 6, 2009 (KR) ........................ 10-2009-0009860

(51) Int. Cl.
*G06F 3/038* (2013.01)
*G09G 5/00* (2006.01)
*G09G 3/32* (2006.01)

(52) U.S. Cl.
CPC ...... *G09G 3/3233* (2013.01); *G09G 2300/0819* (2013.01); *G09G 2300/0852* (2013.01); *G09G 2300/0861* (2013.01); *G09G 2320/0223* (2013.01); *G09G 2320/0233* (2013.01); *G09G 2330/02* (2013.01)
USPC ............................ 345/212; 345/204; 345/211

(58) Field of Classification Search
None
See application file for complete search history.

(56) References Cited

U.S. PATENT DOCUMENTS 8,242,995 B2 * 8/2012 Lee ................................ 345/92
2005/0200575 A1 9/2005 Kim et al.
2005/0275825 A1 * 12/2005 Ohtomo et al. .............. 356/4.04
2005/0285825 A1 12/2005 Eom et al.
2006/0022605 A1 2/2006 Ha et al.

(Continued)

FOREIGN PATENT DOCUMENTS

| | | | |
|---|---|---|---|
| CN | 1892751 | A | 1/2007 |
| EP | 1 887 552 | A1 | 2/2008 |
| JP | 2004-356052 | A | 12/2004 |

(Continued)

OTHER PUBLICATIONS

KIPO Registration Determination Certificate dated Dec. 20, 2010 in priority Korean patent application No. KR 10-2009-0009860, 4 pps.

(Continued)

*Primary Examiner* — William Boddie
*Assistant Examiner* — Alecia D English
(74) *Attorney, Agent, or Firm* — Christie, Parker & Hale, LLP

(57) ABSTRACT

A light emitting display apparatus and method for driving same is provided. In one embodiment, the light emitting display apparatus includes a plurality of pixel circuits, wherein each of the pixel circuits includes a light emitting device, a driving transistor having a first electrode coupled to the light emitting device and a second electrode coupled to a first power voltage supply line, a compensation capacitor having a first terminal coupled to a gate electrode of the driving transistor, a first switching device configured to provide a voltage from the second power voltage supply line to a second terminal of the compensation capacitor in response to an initialization control signal, and a second switching device configured to provide a data signal to the second terminal of the compensation capacitor in response to a scan signal, wherein the first power voltage supply line and the second power voltage supply line are electrically coupled.

21 Claims, 7 Drawing Sheets

(56) References Cited

U.S. PATENT DOCUMENTS

| | | | | |
|---|---|---|---|---|
| 2006/0066532 | A1* | 3/2006 | Jeong | 345/76 |
| 2006/0108937 | A1* | 5/2006 | Kim | 315/169.3 |

FOREIGN PATENT DOCUMENTS

| | | | |
|---|---|---|---|
| JP | 2005-258407 | | 9/2005 |
| KR | 10-2005-0109166 | | 11/2005 |
| KR | 10-2006-0010988 | | 2/2006 |
| KR | 10-0698710 | B1 | 3/2007 |
| KR | 10-0776481 | B1 | 11/2007 |

OTHER PUBLICATIONS

KIPO Office action dated Sep. 30, 2010, for Korean priority Patent application 10-2009-0009860.

Japanese Office action dated Mar. 27, 2012 issued in corresponding Japanese Patent Application No. 2010-018604, 3 pages.

European Office Action by the EPO dated Apr. 18, 2011 in the examination of the European Patent Application No. 10 152 605.1, corresponding to U.S. Appl. No. 12/694,491, 5 pages.

Choi et al.; P-11 An Improved Voltage Programmed Pixel Structure for Large Size and High Resolution AM-OLED Displays, Division of Electrical and Computer Engineering, SID 04 Digest, pp. 260-263; 2004.

Japanese Patent Office action dated Jan. 15, 2013 for corresponding application No. JP 2010-018604 (3 pages).

SIPO Office action dated Sep. 3, 2014, for corresponding Chinese Patent application 201010003996.3, (8 pages).

* cited by examiner

LIGHT EMITTING DISPLAY APPARATUS AND METHOD OF DRIVING THE SAME

CROSS-REFERENCE TO RELATED PATENT APPLICATION

This application claims priority to and the benefit of Korean Patent Application No. 10-2009-0009860, filed on Feb. 6, 2009, in the Korean Intellectual Property Office, the disclosure of which is incorporated herein in its entirety by reference.

BACKGROUND OF THE INVENTION

1. Field of the Invention

The present invention relates to a light emitting display apparatus, and more particularly, to an organic light emitting display apparatus and a method of driving the same.

2. Description of the Related Art

Organic light emitting display apparatuses are display apparatuses that display an image by applying a current or a voltage to organic light emitting diodes (OLED) to emit light by electrically exciting phosphorous organic compound materials.

An OLED includes an anode layer, an organic thin layer, and a cathode layer. The organic thin layer of the OLED has a multi-layer structure including an emitting material layer (EML), an electron transport layer (ETL), and a hole transport layer (HTL) in order to improve balance between electrons and holes to increase light emitting efficiency, and may further include an electron injecting layer (EIL) and a hole injecting layer (HIL). The organic thin layer emits light when holes are combined with electrons in the emitting material layer (EML).

In general, organic light emitting display apparatuses include a plurality of pixels arranged in an N×M matrix, where N and M are natural numbers, and a plurality of driving circuits for driving each of the pixels. The pixels are driven using a passive matrix driving method or an active matrix driving method. In a passive matrix driving method, anode lines and cathode lines are arranged to cross each other perpendicularly and the lines are selected to be driven. In an active matrix driving method, a data signal is applied to each pixel using a switching device, and a capacitor is used to store the data signal, thereby maintaining a previously applied data signal during a period in which data signals are not applied. In order to realize a switching device, a thin film transistor (TFT) may be used. An active matrix driving method is classified as a voltage programming method and/or a current programming method, according to whether a voltage or a current is applied to a capacitor in order to maintain a voltage of the capacitor.

A driving transistor may be used to apply a current corresponding to a data signal to an OLED of each of the pixels. The driving transistor supplies a current according to a data signal input to a gate terminal and supplies the current to the OLED. The amplitude of the current is determined according to a difference in a gate voltage determined by the data signal and a source voltage determined by a driving voltage.

Holes and electrons are excited in the OLED by the current provided by the driving transistor, and light is emitted as the electrons and the holes are combined.

SUMMARY OF THE INVENTION

The present invention provides a light emitting display apparatus and a method of driving the same, whereby problems related to variations in the power voltage applied to each pixel, according to the position of the pixels, which is due to a parasitic resistance component of a wiring or a voltage drop due to a current applied to each pixel circuit according to an increased size of a panel, are addressed.

The present invention also provides a light emitting display apparatus and a method of driving the same, whereby variations of a power voltage that is applied to compensate for a threshold voltage of a driving circuit of each pixel circuit can be removed.

One embodiment of the present invention relates to a light emitting display apparatus including a plurality of pixel circuits, wherein each of the pixel circuits includes a light emitting device, a driving transistor having a first electrode coupled to the light emitting device and a second electrode coupled to a first power voltage supply line, a compensation capacitor having a first terminal coupled to a gate electrode of the driving transistor, a first switching device configured to provide a voltage from the second power voltage supply line to a second terminal of the compensation capacitor in response to an initialization control signal, and a second switching device configured to provide a data signal to the second terminal of the compensation capacitor in response to a scan signal, wherein the first power voltage supply line and the second power voltage supply line are electrically coupled.

Another embodiment of the present invention relates to a light emitting display apparatus including a first power voltage supply line configured to provide a first power voltage, a second power voltage supply line configured to provide a second power voltage, and a plurality of pixel circuits, each including a light emitting device, a driving transistor configured to receive the first power voltage and to generate a light emitting input signal for the light emitting device in response to a data signal, and a compensation capacitor having a first terminal coupled to a gate electrode of the driving transistor, the compensation capacitor configured to receive the second power voltage and to compensate for a threshold voltage of the driving transistor, wherein the first power voltage supply line and the second power voltage supply line are electrically coupled.

Another embodiment of the present invention relates to a light emitting display apparatus including a plurality of pixel circuits, a first power voltage supply line configured to provide a first power voltage to each of the plurality of the pixel circuits, a second power voltage supply line configured to provide a second power voltage to each of the plurality of the pixel circuits, and a power voltage compensating unit configured to compensate for a voltage drop of the first power voltage supply line and the second power voltage supply line, wherein each of the plurality of pixel circuits comprises a data input unit configured to receive a data signal, and to provide the data signal in response to a scan signal, a threshold voltage compensating unit configured to receive the data signal and the second power voltage, a driving unit configured to receive the data signal from the threshold voltage compensating unit and to generate a light emitting input signal based on the data signal and the first power voltage, and a light emitting unit configured to emit light in response to the light emitting input signal, wherein the threshold voltage compensating unit is configured to compensate for a threshold voltage of the driving unit.

Another embodiment of the present invention relates to a method of driving a light emitting display apparatus including a plurality of pixel circuits, each pixel circuit including a light emitting device, a driving transistor configured to provide a light emitting input signal to the light emitting device based on a magnitude of a data signal, the driving transistor configured to be driven by a first power voltage, and a compensation capacitor having a first terminal coupled to a second power voltage via a switching device and a second terminal coupled to a gate terminal of the driving transistor, wherein the compensation capacitor is configured to compensate for a threshold voltage of the driving transistor, the method including charging the compensation capacitor to a level of the threshold voltage of the driving transistor by applying the second power voltage to the compensation capacitor via the switching device, compensating for the threshold voltage of the driving transistor, wherein the data signal is provided to a gate electrode of the driving transistor via the compensation capacitor, and providing the light emitting input signal, from the driving transistor, to the light emitting device, wherein a first power voltage supply line, for supplying the first power voltage, and a second power voltage supply line, for supplying the second power voltage, are electrically coupled.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF EXEMPLARY EMBODIMENTS

In the following detailed description, with reference to the accompanying drawings, only certain exemplary embodiments of the present invention are shown and described by way of illustration. As those skilled in the art would recognize, the invention may be embodied in many different forms and should not be construed as being limited to the embodiments set forth herein. Accordingly, the scope of the invention is to be defined by the appended claims and their equivalents. The terms used herein should be understood with meanings and concepts in conformity with the technical aspects of the present invention, describing the present invention in ways that enable those of ordinary skill in the art to make and use the invention.

Figure 1:
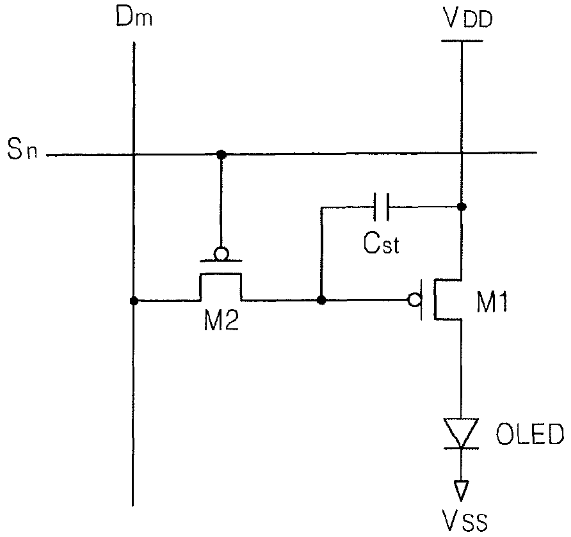
FIG. 1 (PRIOR ART)
FIG. 1 illustrates a conventional pixel circuit of a light emitting display apparatus.

FIG. 1 is a schematic view illustrating a conventional pixel circuit of a light emitting display apparatus.

The pixel circuit of the light emitting display apparatus includes a light emitting device (e.g., an organic light emitting diode OLED), a driving transistor M1, a scanning transistor M2, and a storage capacitor Cst. The driving transistor M1 supplies a current in response to a data signal Dm that is input through the scanning transistor M2 to the light emitting device OLED. The data signal Dm is applied to the driving transistor M1 only for a predetermined period in response to a scan signal Sn. Also, while the data signal Dm is being applied during a scanning period, the data signal Dm is stored in the storage transistor Cst, and a voltage corresponding to the data signal Dm is applied to the driving transistor M1 even after the scanning period. When the current generated by the driving transistor M1 is applied to the light emitting device OLED, the light emitting device OLED emits light having luminance corresponding to the amplitude of the current applied to the light emitting device OLED.

The amplitude of the current applied from the driving transistor M1 to the light emitting device is as in Equation 1 below:

$$I_{OLED} = \frac{\beta}{2}(V_{gs} - V_{th})^2 = \frac{\beta}{2}(VDD - V_{data} - |V_{th}|)^2 \qquad \text{Equation 1}$$

where $I_{OLED}$ is a current applied to the light emitting device OLED, $V_{gs}$ is a voltage between a gate electrode and a source electrode of the driving transistor M1, Vth is a threshold voltage of the driving transistor M1, Vdata is the voltage of the data signal Dm applied to the gate electrode of the driving transistor M1 via the scanning transistor M2, and β is a constant. As expressed in Equation 1, the current supplied to the light emitting device OLED is a function of the voltage Vdata of the data signal Dm, a power voltage VDD, and the threshold voltage Vth. However, as the size of a panel is increased, the power voltage VDD, hereinafter referred to as a first power voltage VDD, and the threshold voltage Vth increasingly vary according to the position of pixels.

Figure 2:
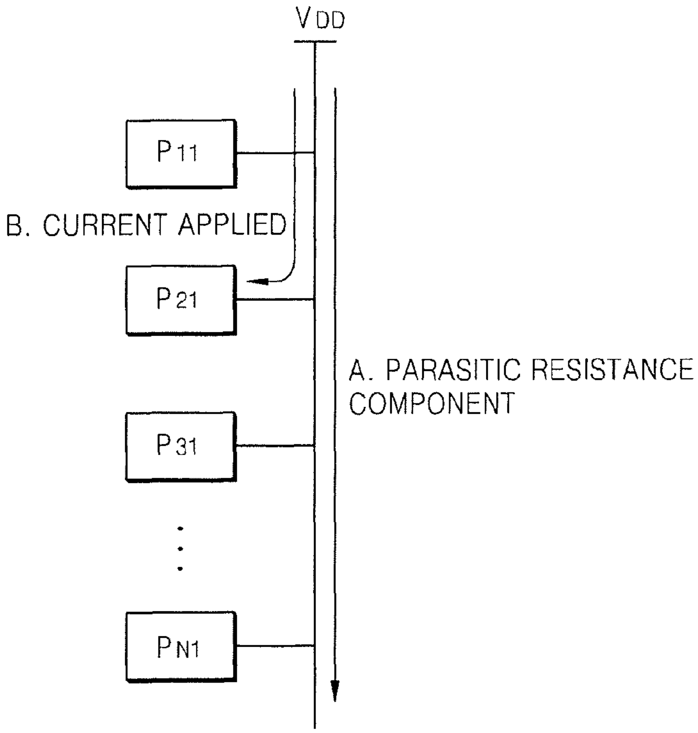
FIG. 2 (PRIOR ART)
FIG. 2 is a schematic view for explaining a phenomenon that occurs in a large-sized panel.

FIG. 2 is a schematic view for explaining a phenomenon that occurs in a large-sized panel.

In general, a panel includes a plurality of pixel circuits arranged in an N×M matrix, and a data signal Dm, a scan signal Sn, and a first power voltage VDD are applied to each of the pixel circuits. The first power voltage VDD may be commonly supplied to all of the pixel circuits.

However, as illustrated in FIG. 2, as the first power voltage VDD is supplied to each of the pixel circuits, a voltage drop may occur. A parasitic resistance component is usually present in a wiring for supplying a power voltage, and when the first power voltage VDD is supplied through the wiring, a voltage drop occurs due to the parasitic resistance component. Accordingly, due to this voltage drop, the longer the wiring between the pixel circuits and the voltage source of the first power voltage VDD, the greater the voltage drop of the first power voltage VDD supplied to each of the pixel circuits due to the parasitic resistance of the wiring.

Also, when the first power voltage VDD is applied as a driving voltage of the driving transistor M1 of each pixel circuit, a current is supplied from a first power voltage supply line to the driving transistor M1. Due to the current being applied to each of the pixel circuits, the voltage level of the first power voltage VDD supplied to the pixel circuits drops as the position of the pixel circuit is farther away from a supply point of the first power voltage VDD as shown with B of FIG. 2. Thus, long range non-uniformity (LR), wherein the first power voltage VDD of Equation 1 varies according to the position of pixels, occurs.

Figure 4:
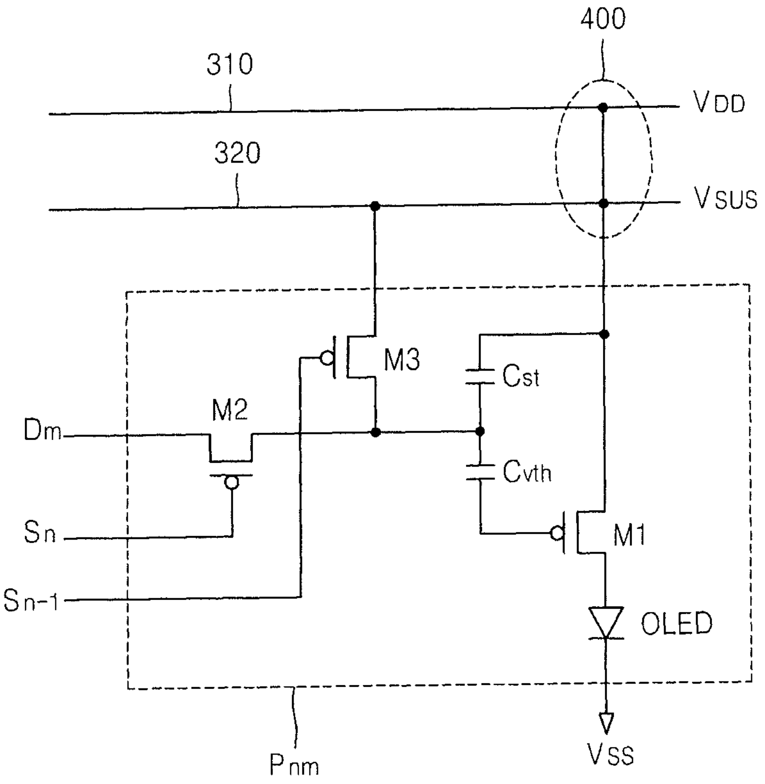
FIG. 4 illustrates a pixel circuit for a light emitting display apparatus according to an embodiment of the present invention.

Also, as described above, short range non-uniformity (SR), which refers to variation in the amount of current supplied to the light emitting device OLED due to variation in the threshold voltage Vth of a TFT caused by irregularities in the manufacturing process, may occur. The degree of the problem increases as the size of the panel increases. Referring now to FIG. 4, for example, in order to compensate for the irregularities (e.g., non-uniformities) in the threshold voltage Vth of the pixel circuits, each of the pixel circuits, according to one embodiment, further includes a compensation capacitor Cvth connected to a gate terminal of the driving transistor M1. By applying a predetermined power voltage to the compensation capacitor Cvth, embodiments of the pixel circuits compensate for irregularities in the threshold voltage Vth. The predetermined power voltage in one embodiment may be an additional second power voltage Vsus. The second power voltage Vsus may also vary due to a voltage drop shown by A in FIG. 2 due to a parasitic resistance component of a second power voltage supply line and/or the voltage drop shown by B in FIG. 2 due to a current applied to each of the pixel circuits.

In general, the supply line of the second power voltage Vsus has smaller supply capacity than the supply line of the first power voltage VDD. In this case, the second power voltage Vsus is more sensitive to the size of the panel, and thus varies more as the size of the panel is increased.

In order to solve this problem, in several embodiments, as shown in FIG. 4, for example, the first power voltage VDD and the second power voltage Vsus are electrically connected to each other to compensate for the variations in the second power voltage Vsus.

Figure 3:
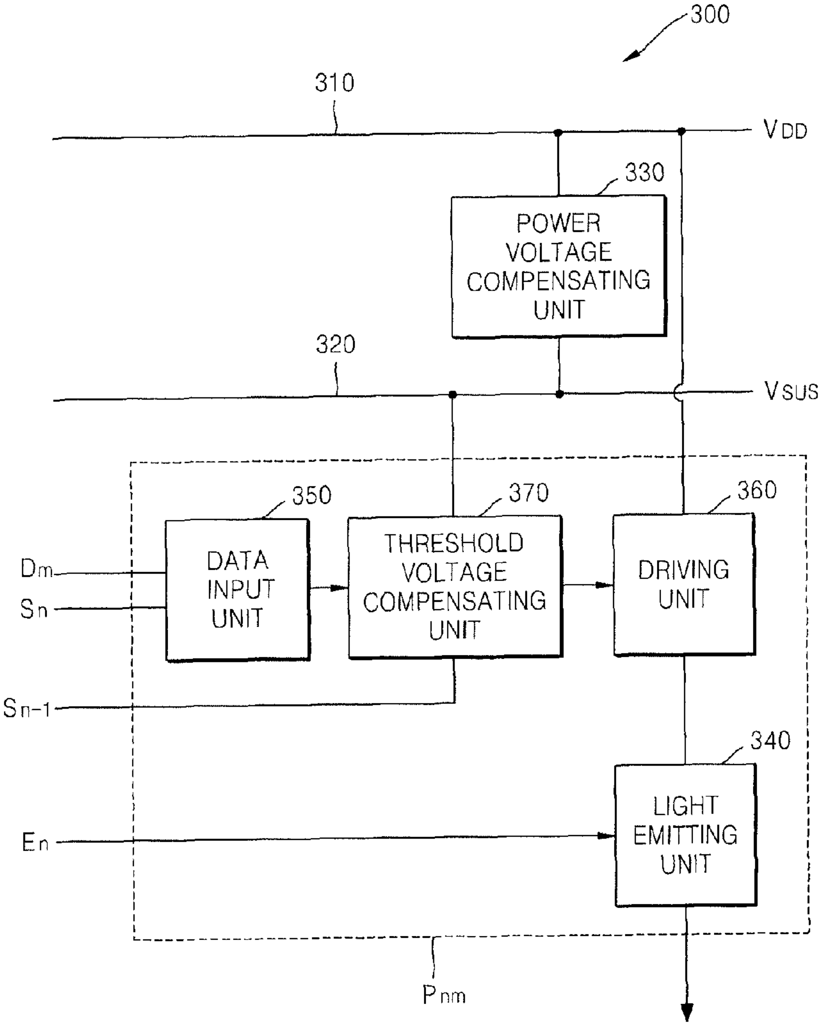
FIG. 3 is a schematic view illustrating a light emitting display apparatus according to an embodiment of the present invention.

FIG. 3 illustrates a light emitting display apparatus 300 according to an embodiment of the present invention.

The light emitting display apparatus 300 includes a plurality of pixel circuits Pnm, a first power voltage supply line 310, a second power voltage supply line 320, and a power voltage compensating unit 330.

Figure 5:
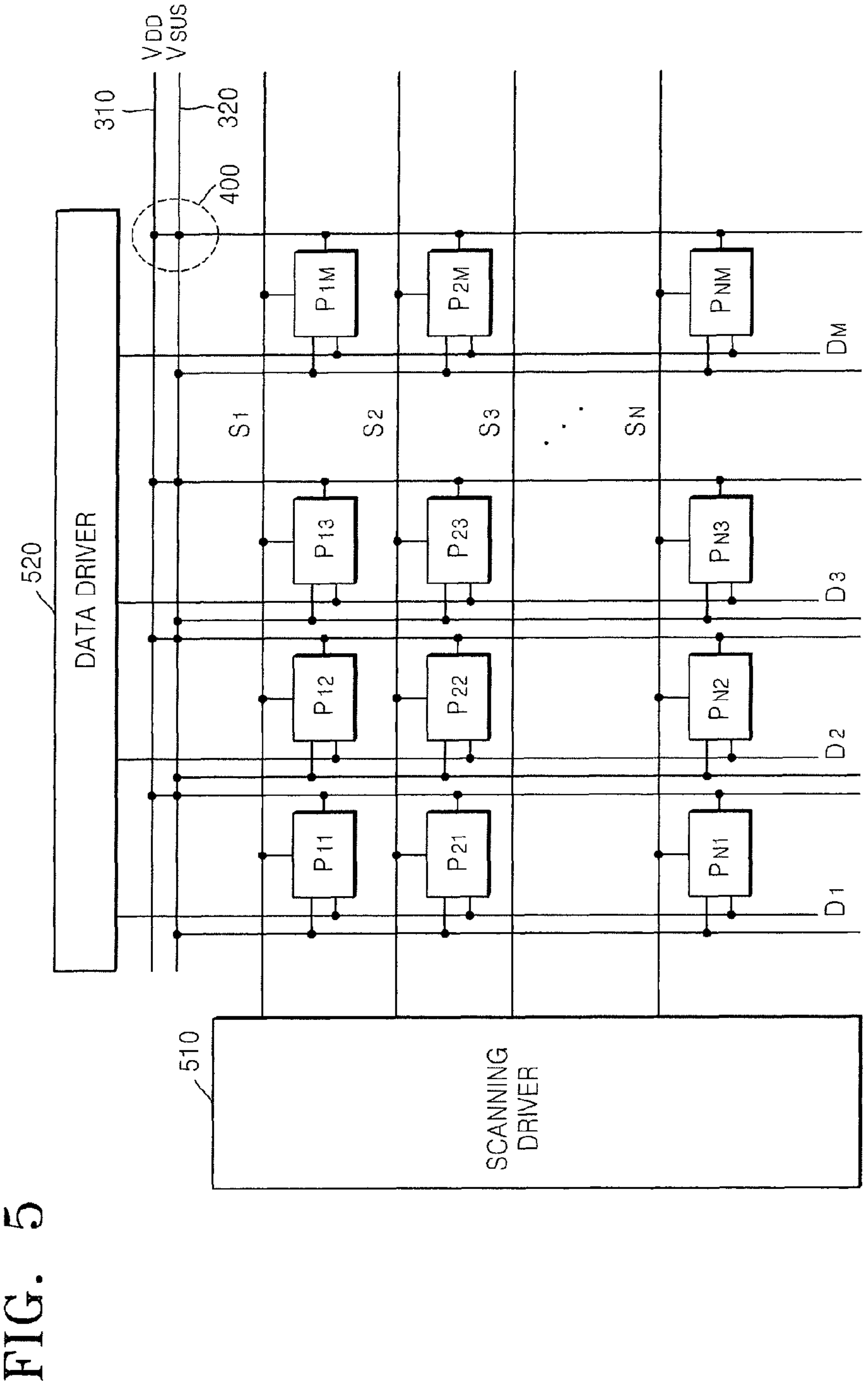
FIG. 5 illustrates a light emitting display apparatus that can be used with the pixel circuit of FIG. 4.

The plurality of pixel circuits Pnm may be arranged in an N×M matrix as illustrated in FIG. 5, for example.

The first power voltage supply line 310 and the second power voltage supply line 320 are connected to each of the pixel circuits Pnm and apply a first power voltage VDD and a second power voltage Vsus, respectively, thereto. To this end, the first power voltage supply line 310 may be electrically connected to a first power voltage source (not shown) that supplies the first power voltage VDD, and the second power voltage supply line 320 may be electrically connected to a second power voltage source (not shown) that supplies the second power voltage Vsus.

Also, in a number of embodiments, the first power voltage VDD and the second power voltage Vsus may have the same voltage level. In one embodiment, for example, the first power voltage supply line 310 and the second power voltage supply line 320 may be connected to a single source to provide the same voltage level.

The power voltage compensating unit 330 compensates for variations between the voltage levels of the first power voltage supply line 310 and the voltage levels of the second power voltage supply line 320. According to one embodiment of the invention, the power voltage compensating unit 330 may be realized by electrically connecting the first power voltage supply line 310 and the second power voltage supply line 320 to each other. Also, the electrical connection between the first power voltage supply line 310 and the second power voltage supply line 320 may be realized using additional wiring therebetween. Alternatively, the electrical connection may be realized using a switching device that electrically connects the first power voltage supply line 310 and the second power voltage supply line 320 in response to a control signal (e.g., a predetermined control signal). However, the present invention is not limited thereto, and, in one embodiment, the power voltage compensating unit 330 may be realized using circuitry that can compensate for voltage drops of the first power voltage supply line 310 and the second power voltage supply line 320.

The plurality of the pixel circuits Pnm may include a light emitting unit 340, a data input unit 350, a driving unit 360, and a threshold voltage compensating unit 370.

The light emitting unit 340 receives a light emitting input signal and emits light having luminance according to the amplitude of the received light emitting input signal. The light emitting unit 340 may be any light emitting device that emits light in response to an electrical input signal. In one embodiment, the light emitting unit may be an OLED. Also, the light emitting input signal may be a current input.

Furthermore, the light emitting unit 340 may be configured to receive the light emitting input signal at periods (e.g., predetermined periods) in response to a light emitting control signal En. Then the light emitting input signal may be provided to the light emitting unit via a switching device that is switched in response to the light emitting control signal En.

In several embodiments, the data input unit 350 receives a data signal Dm in response to a scan signal Sn, and stores the received data signal Dm for a predetermined period, for example, until the data signal Dm of the next frame is provided to the data input unit 350. To this end, the data input unit 350 may include a switching device that is switched in response to the scan signal Sn. Also, the data input unit 350 may further include a storage capacitor for storing the received data signal Dm.

In one embodiment, before the data signal Dm is provided to the data input unit 350, the threshold voltage compensating unit 370 stores a voltage corresponding to a threshold voltage of the driving unit 360 in order to compensate for the threshold voltage of the driving unit 360, and then compensates for the voltage drop corresponding to the threshold voltage as the data signal Dm is provided to the driving unit 360. To this end, the threshold voltage compensating unit 370 may include a compensation capacitor for storing a voltage corresponding to the threshold voltage of the driving unit 360. Also, the threshold voltage compensating unit 370 may further include a switching device that applies the second power voltage Vsus to the compensation capacitor in response to an initialization control signal Sn−1 that is generated during a predetermined period before the data signal Dm is provided to the data input unit 350. Moreover, the threshold voltage compensating unit 370 may further include a switching device to diode-connect a driving transistor of the driving unit 360 in response to the initialization control signal Sn−1.

In one embodiment, the driving unit 360 receives the data signal Dm via the threshold voltage compensating unit 370, generates a light emitting input signal corresponding to the amplitude of the data signal Dm, and outputs the light emitting input signal to the light emitting unit 340. To this end, the driving unit 360 may include a driving transistor. The driving transistor may receive the data signal Dm from a gate electrode to generate the light emitting input signal. The first power voltage VDD may be applied to a source electrode of the driving transistor as a driving voltage of the driving transistor via the first power voltage supply line 310.

FIG. 4 illustrates a pixel circuit for a light emitting display apparatus, according to an embodiment of the present invention.

The pixel circuit includes an organic light emitting device OLED, a driving transistor M1, a first switching device M3, a compensation capacitor Cvth, a second switching device M2, and a storage capacitor Cst. The first power voltage supply line 310 is connected to the driving transistor M1 to supply a driving voltage, and the second power voltage supply line 320 is connected to an end of the first switching device M3.

In the embodiment illustrated in FIG. 4, the first power voltage supply line 310 and the second power voltage supply line 320 are electrically connected to each other to compensate for voltage drops of the first power voltage supply line 310 and the second power voltage supply line 320. To this end, a wire (e.g., power voltage compensation wiring) or another electrical conductor 400 is located between the first power voltage supply line 310 and the second power voltage supply line 320.

Before the data signal Dm is provided to the pixel circuit in response to the scan signal Sn, a voltage for compensating a threshold voltage of the driving transistor M1 is stored in the compensation capacitor Cvth. To this end, an initialization control signal Sn−1 is applied during a predetermined period before a scan signal Sn is applied, and a second power voltage Vsus is applied to the compensation capacitor Cvth via the first switching device M3 in response to the generated initialization control signal Sn−1. A voltage is stored in the compensation capacitor Cvth up to a voltage level corresponding to the threshold voltage of the driving transistor M1 by the second power voltage Vsus.

In one embodiment, after the predetermined period in which the initialization control signal Sn−1 is applied, the scan signal Sn is applied, and the data signal Dm is provided through the second switching device M2. The data signal Dm is applied to the storage capacitor Cst during the period in which the scan signal Sn is applied, and the storage capacitor Cst stores the data signal Dm. The data signal Dm may be stored using a voltage programming method or a current programming method.

The data signal Dm stored in the storage capacitor Cst is provided to a gate electrode of the driving transistor M1 through the compensation capacitor Cvth. Here, the threshold voltage of the driving transistor M1 is compensated for by the compensation capacitor Cvth, and thus a light emitting input signal generated in the driving transistor M1 is independent from the threshold voltage of the driving transistor M1.

The light emitting input signal is provided to the light emitting device OLED, and the light emitting device OLED emits light having luminance corresponding to the amplitude of the light emitting input signal. The light emitting input signal may be a current input.

In the embodiment illustrated in FIG. 4, the first switching device M3 and the second switching device M2 may be p-type metal oxide semiconductor field-effect transistors (MOSFETs), but are not limited thereto and may be replaced with any devices that function as switches in response to predetermined control signals.

In one embodiment, the second switching device M2 and the storage capacitor Cst may correspond to the data input unit 350 of FIG. 3, and the first switching device M3 and the compensation capacitor Cvth may correspond to the threshold voltage compensating unit 370 of FIG. 3. Similarly, the driving transistor M1 may correspond to the driving unit 360 of FIG. 3, and the light emitting device OLED may correspond to the light emitting unit 340 of FIG. 3. Also, the power voltage compensation wiring 400 may correspond to the power voltage compensating unit 330 of FIG. 3.

FIG. 5 illustrates a light emitting display apparatus that can be used with the pixel circuit of FIG. 4.

A plurality of pixel circuits Pnm may be arranged in an N×M matrix. The first power voltage supply line 310 and the second power voltage supply line 320 are connected to each of the pixel circuits Pnm. The first power voltage supply line 310 and the second power voltage supply line 320 may be electrically connected to each other via the power voltage compensation wiring 400. Also, the light emitting display apparatus, according to the embodiment illustrated in FIG. 5, may further include a scanning driver 510 supplying a scan signal Sn to the plurality of the pixel circuits Pnm, and a data driver 520 supplying a data signal Dm to the plurality of the pixel circuits Pnm. According to the embodiment illustrated in FIG. 5, the scan signal Sn is commonly supplied to all of the pixel circuits Pnm on the same row.

According to the embodiment illustrated in FIG. 5, a plurality of the power voltage compensation wirings 400 may be located at multiple positions. Also, according to another embodiment, the power voltage compensation wiring 400 may be located between the first power voltage supply line 310 and the second power voltage supply line 320 near a predetermined pixel circuit Pnm that is located farther from a first power voltage supply source (not shown) than other pixel circuits. In such case, the distance between a node along the first power source voltage line 310 corresponding to the predetermined pixel circuit Pnm and the first power voltage supply source (not shown) is longer than the distances between other nodes along the first power source voltage line 310 corresponding to other pixel circuits and the first power voltage supply source. Similarly, in other embodiments, the power voltage compensation wiring 400 may be located between the first power voltage supply line 310 and the second power voltage supply line 320 near a predetermined pixel circuit Pnm that is located farther from a second power voltage supply source (not shown) than other pixel circuits. In such case, the distance between a node along the second power source voltage line 320 corresponding to the predetermined pixel circuit Pnm and the second power voltage supply source (not shown) is longer than the distances between other nodes along the second power source voltage line 320 corresponding to other pixel circuits and the second power voltage supply source.

Figure 6:
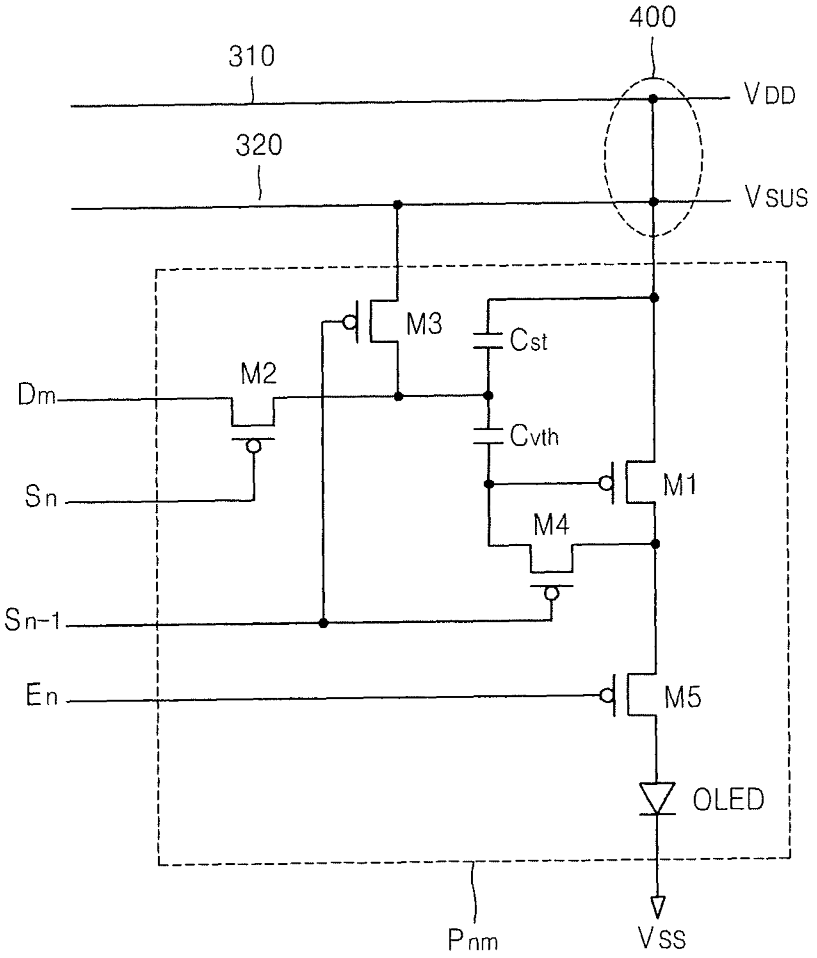
FIG. 6 illustrates a pixel circuit for a light emitting display apparatus, according to another embodiment of the present invention.

FIG. 6 is a pixel circuit for a light emitting display apparatus, according to another embodiment of the present invention.

The light emitting display apparatus according to the embodiment shown in FIG. 6 includes a light emitting device OLED, a fourth switching device M5, a driving transistor M1, a first switching device M3, a third switching device M4, a compensation capacitor Cvth, a second switching device M2, and a storage capacitor Cst. A first power voltage supply line 310 is connected to the driving transistor M1 to supply a driving voltage, and a second power voltage supply line 320 is connected to an end of the first switching device M3.

In one embodiment, when an initialization control signal Sn−1 is applied, the first switching device M3 and the third switching device M4 are turned on.

In one embodiment, as the third switching device M4 is turned on, the driving transistor M1 is diode-connected, and a voltage Vgs between a gate electrode and a source electrode of the driving transistor M1 increases up to a threshold voltage Vth of the driving transistor M1. A source voltage of the driving transistor M1 is provided by the first power voltage VDD, and thus the voltage applied to the gate terminal of the driving transistor M1, that is, to one terminal of the compensation capacitor Cvth, is the sum of the first power voltage VDD and the threshold voltage Vth.

Also, as the first switching device M3 is turned on, a second power voltage Vsus is applied to the other terminal of the compensation capacitor Cvth.

Accordingly, a voltage $V_{Cvth}$ applied between the terminals of the compensation capacitor Cvth can be expressed as recited in Equation 2 below:

$$V_{Cvth}=V_{Cvth1}-V_{Cvth2}=(VDD+V_{th})-V_{sus} \quad \text{Equation 2}$$

where $V_{Cvth1}$ is a potential applied to one terminal of the compensation capacitor Cvth and $V_{Cvth2}$ is a potential applied to the other terminal of the compensation capacitor Cvth.

In one embodiment, the initialization control signal Sn−1 is no longer applied, and a scan signal Sn is applied. In such case, the operations of the second switching device M2 and the storage capacitor Cst according to the scan signal Sn can be the same as described with reference to the embodiments of FIG. 4.

The voltage Vgs between the gate electrode and the source electrode of the driving transistor M1 after the data signal Dm is stored in the storage capacitor Cst can be expressed as recited in Equation 3 below:

$$V_{gs}=(V_{data}+(VDD+V_{th}-V_{sus}))-VDD=V_{data}+V_{th}-V_{sus} \quad \text{Equation 3}$$

A current $I_{OLED}$ flowing to the light emitting device (e.g., OLED) can be expressed as recited in Equation 4 below:

$$\begin{aligned} I_{OLED} &= \frac{\beta}{2}(V_{gs}-V_{th})^2 \\ &= \frac{\beta}{2}((V_{data}+V_{th}-V_{sus})-V_{th})^2 \\ &= \frac{\beta}{2}(V_{data}-V_{sus})^2 \end{aligned} \quad \text{Equation 4}$$

In other words, a light emitting input signal as expressed in Equation 4 is provided to the light emitting device OLED, and light having luminance corresponding to the amplitude of the current $I_{OLED}$, which is the light emitting input signal, is emitted from the light emitting device OLED. The amplitude of the light emitting input signal is dependent on the amplitudes of the data signal Vdata and the second power voltage Vsus as expressed in Equation 4. Accordingly, if the second power voltage Vsus is applied to the pixel circuits unevenly due to a voltage drop (A) or (B) (see FIG. 2) according to the position of each pixel circuit along the second power voltage supply line 320, distortions may occur in a displayed image.

In order to address this problem, a structure for compensating for the voltage drop of the second power voltage supply line 320 can be formed in the light emitting display apparatus according to an embodiment of the present invention. In some embodiments, the structure may be, for example, the power voltage compensation wiring 400 formed between the first power voltage supply line 310 and the second power voltage supply line 320. In the past, the first power voltage supply line 310 and the second power voltage supply line 320 have been arranged in a complementary relationship such that if one of the two lines is thickened, the other is reduced. In such case, a voltage drop along one of the two lines can develop, and thus, cross-talk may be generated. In several embodiments of the present invention, the first power voltage supply line 310 and the second power voltage supply line 320 are electrically connected to each other so as to compensate for the voltage drops of the first power voltage supply line 310 and the voltage of the second power voltage supply line 320, thereby preventing cross-talk.

Figure 7:
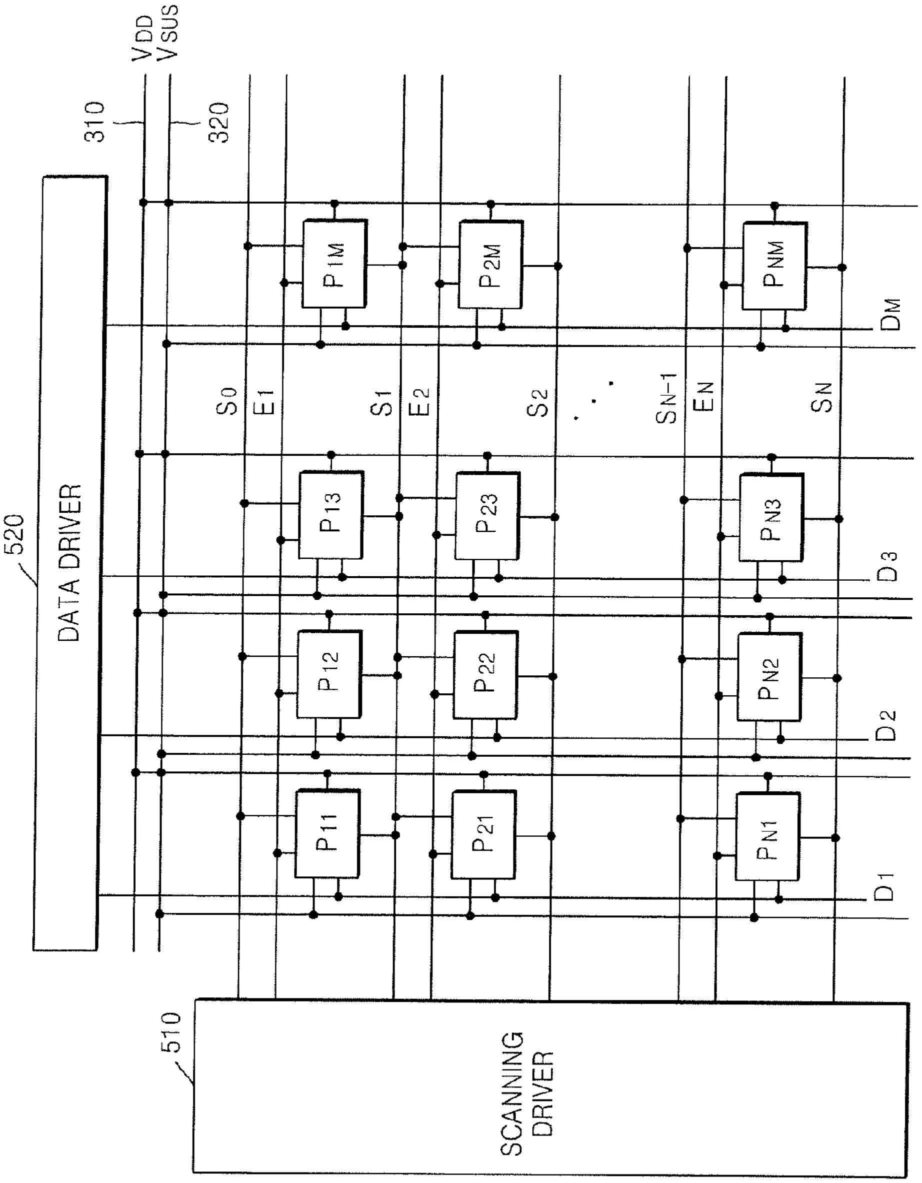
FIG. 7 illustrates a light emitting display apparatus that can be used with the pixel circuit of FIG. 6.

FIG. 7 illustrates a light emitting display apparatus that can be used with the pixel circuit of FIG. 6.

In the embodiment illustrated in FIG. 7, a plurality of pixel circuits Pnm may be arranged in an N×M matrix. The first power voltage supply line 310 and the second power voltage supply line 320 are connected to each of the pixel circuits Pnm. The first power voltage supply line 310 and the second power voltage supply line 320 may be electrically connected to each other via the power voltage compensation wiring 400. Also, the light emitting display apparatus, according to the embodiment illustrated in FIG. 7, may further include a scanning driver 510 supplying a scan signal Sn and a light emitting control signal En to the plurality of the pixel circuits Pnm, and a data driver 520 supplying a data signal Dm to the plurality of the pixel circuits Pnm. According to the embodiment illustrated in FIG. 7, the scan signal Sn may be commonly supplied to all of the pixel circuits Pnm of the same row. Also, according to the embodiment illustrated in FIG. 7, an initialization control signal Sn−1 is a scan signal of a previous row, which is applied before the scan signal Sn for a predetermined pixel circuit Pnm is applied.

Figure 8:
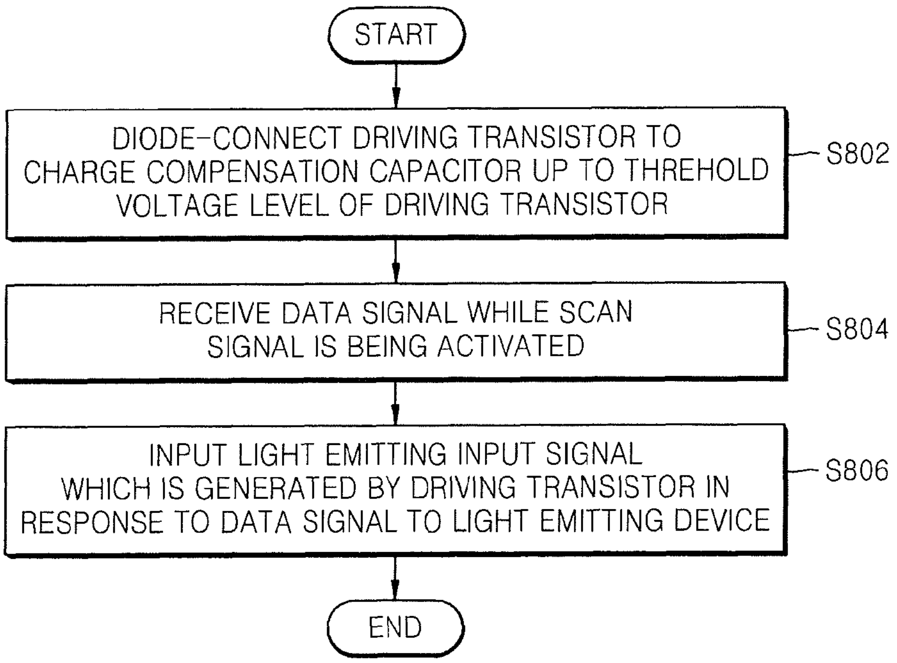
FIG. 8 is a flowchart illustrating a method of driving a light emitting display apparatus according to an embodiment of the present invention.

FIG. 8 is a flowchart illustrating a method of driving a light emitting display apparatus according to an embodiment of the present invention.

In one embodiment of the light emitting display apparatus, a data signal Dm is provided to each of the pixel circuits during a frame, and, more specifically, the data signal Dm may be provided sequentially to the pixel circuits Pnm arranged in the same columns while a scan signal Sn is generated during one frame. Also, the initialization control signal Sn−1 and the light emitting control signal En may be commonly supplied to the pixel circuits Pnm of the same rows or may be generated sequentially with respect to each row.

In one embodiment, when the initialization control signal Sn−1 is provided, a driving transistor M1 is diode-connected, and a second power voltage Vsus is applied to a compensation capacitor Cvth via a first switching device M3 in operation S802. The compensation capacitor Cvth is charged up to the level of a threshold voltage Vth of the driving transistor M1 while the initialization control signal Sn−1 is provided.

In one embodiment, after the initialization control signal Sn−1 is no longer applied, the scan signal Sn is applied. While the scan signal Sn is being applied, the data signal Dm is received and stored in the storage capacitor Cst in operation S804. The data signal Dm stored in a storage capacitor Cst is then provided to the gate terminal of the driving transistor M1 via the compensation capacitor Cvth, and the driving transistor M1 generates a light emitting display signal in response to the input data signal Dm. The driving transistor M1 is driven by a first power voltage VDD.

Next, the light emitting control signal En is applied, and while the light emitting control signal En is being applied, the light emitting display signal generated by the driving transistor M1 is provided to an organic light emitting device OLED in operation S806. The organic light emitting device OLED emits light having luminance according to the light emitting display signal. According to one embodiment of the present invention, a first power voltage supply line supplying the first power voltage and a second power voltage supply line supplying the second power voltage are electrically connected to each other.

In one embodiment, the light emitting display apparatus and the method of driving the same apparatus can compensate for the voltage drop of the power voltage applied to each pixel, which is due, at least in part, to the increased panel size.

In one embodiment, by compensating for the voltage drop of the power voltage, distortions in the output image of the light emitting display apparatus, which are also due, at least in part, to the increased panel size, can be reduced.

Furthermore, crosstalk between the plurality of power voltage supply lines can be removed.

While the present invention has been particularly shown and described with reference to exemplary embodiments thereof, the terminology used herein is for the purpose of describing particular embodiments only and is not intended to be limiting of the scope of the invention. Thus, it will be understood by those of ordinary skill in the art that various changes in form and details may be made therein without departing from the spirit of the present invention, the scope of which is defined by the following claims and their equivalents.

What is claimed is:

1. A light emitting display apparatus comprising:
a power voltage compensating unit; and
a plurality of pixel circuits, wherein each of the plurality of pixel circuits comprises:
a light emitting device;
a driving transistor having a first electrode coupled to the light emitting device, and a second electrode coupled to a first power voltage supply line that is coupled to the power voltage compensating unit;
a compensation capacitor having a first terminal coupled to a gate electrode of the driving transistor;
a first switching device configured to provide a voltage from a second power voltage supply line to a second terminal of the compensation capacitor in response to an initialization control signal, the second power voltage supply line being coupled to the power voltage compensating unit;
a second switching device configured to provide a data signal to the second terminal of the compensation capacitor in response to a scan signal; and
a storage capacitor having a first terminal coupled to the second terminal of the compensation capacitor, and a second terminal directly coupled to both the first power voltage supply line and the second power voltage supply line,
wherein the first power voltage supply line and the second power voltage supply line are electrically-connected to each other via the power voltage compensating unit outside the plurality of pixel circuits.

2. The light emitting display apparatus of claim 1, wherein the power voltage compensating unit comprises at least one wire that electrically connects the first power voltage supply line to the second power voltage supply line.

3. The light emitting display apparatus of claim 2, wherein the at least one wire is located proximate to a pixel circuit located farther from a second power voltage source, for supplying voltage to the second power voltage supply line, than pixel circuits nearer to the second power voltage supply source.

4. The light emitting display apparatus of claim 1, wherein each of the plurality of pixel circuits further comprises a third switching device configured to electrically couple a gate electrode of the driving transistor to the first electrode of the driving transistor in response to the initialization control signal.

5. The light emitting display apparatus of claim 4, wherein the initialization control signal for a pixel circuit during a current scanning period is a previous scan signal generated during a previous scanning period.

6. The light emitting display apparatus of claim 4, wherein each of the plurality of pixel circuits further comprises a fourth switching device coupled between the first electrode of the driving transistor and the light emitting device, wherein the fourth switching device is configured to switch in response to a light emitting control signal.

7. The light emitting display apparatus of claim 1, wherein the light emitting device is an organic light emitting diode (OLED).

8. A light emitting display apparatus comprising:
a first power voltage supply line configured to provide a first power voltage;
a second power voltage supply line configured to provide a second power voltage;
a power voltage compensating unit coupled to the first power voltage supply line and the second voltage power supply line; and
a plurality of pixel circuits, each comprising:
a light emitting device;
a driving transistor configured to receive the first power voltage and to generate a light emitting input signal for the light emitting device in response to a data signal;
a compensation capacitor having a first terminal coupled to a gate electrode of the driving transistor and having a second terminal configured to receive the data signal, the compensation capacitor configured to receive the second power voltage and to compensate for a threshold voltage of the driving transistor; and
a storage capacitor having a first terminal coupled to the second terminal of the compensation capacitor, and a second terminal directly coupled to both the first power voltage supply line and the second power voltage supply line,
wherein the first power voltage supply line and the second power voltage supply line are electrically-connected to each other via the power voltage compensating unit.

9. The light emitting display apparatus of claim 8, wherein the power voltage compensating unit comprises at least one wire electrically connecting the first and second power voltage supply lines.

10. The light emitting display apparatus of claim 8, wherein each of the plurality of pixel circuits further comprises:
a first switching device configured to provide the second power voltage to a second terminal of the compensation capacitor in response to an initialization control signal; and
a second switching device configured to provide the data signal to the second terminal of the compensation capacitor in response to a scan signal;
wherein the driving transistor has a first electrode coupled to the light emitting device and a second electrode coupled to the first power voltage supply line.

11. The light emitting display apparatus of claim 10, further comprising:
a scanning driver configured to provide the scan signal and the initialization control signal; and
a data driver configured to provide the data signal.

12. The light emitting display apparatus of claim 10, wherein the light emitting device is an organic light emitting diode (OLED).

13. The light emitting display apparatus of claim 8, wherein:
the first power voltage supply line comprises a plurality of first lines and a second line, wherein the first lines are connected to the plurality of pixel circuits, and the second line is connected to the first lines and arranged outside the plurality of pixel circuits;
the second power voltage supply line comprises a plurality of first lines and a second line, wherein the first lines are connected to the plurality of pixel circuits, and the second line is connected to the first lines and arranged outside the plurality of pixel circuits; and the power voltage compensating unit electrically connected to the second line of the first power voltage supply line and the second line of the second voltage power supply line at outside the plurality of pixel circuits.

14. A light emitting display apparatus comprising:

a plurality of pixel circuits;

a first power voltage supply line configured to provide a first power voltage to each of the plurality of the pixel circuits;

a second power voltage supply line configured to provide a second power voltage to each of the plurality of the pixel circuits; and a power voltage compensating unit coupled to the first power voltage supply line and the second voltage power supply line, and configured to compensate for a voltage drop of the first power voltage supply line and the second power voltage supply line by electrically connecting the first power voltage supply line to the second power voltage supply line, wherein each of the plurality of pixel circuits comprises:

a data input unit comprising a storage capacitor, the data input unit being configured to receive a data signal, and to provide the data signal in response to a scan signal;

a threshold voltage compensating unit comprising a compensation capacitor, the threshold voltage compensating unit being configured to receive the data signal and the second power voltage;

a driving unit configured to receive the data signal from the threshold voltage compensating unit and to generate a light emitting input signal based on the data signal and the first power voltage; and a light emitting unit configured to emit light in response to the light emitting input signal;

wherein the threshold voltage compensating unit is configured to compensate for a threshold voltage of the driving unit, wherein the threshold voltage compensating unit and the power voltage compensating unit are separate and distinct units, wherein the compensation capacitor has a first terminal coupled to the driving unit, and a second terminal coupled to the data input unit, and wherein the storage capacitor has a first terminal coupled to the second terminal of the compensation capacitor, and a second terminal directly coupled to both the first power voltage supply line and the second power voltage supply line.

15. The light emitting display apparatus of claim 14, wherein the power voltage compensating unit comprises at least one wire that electrically connects the first power voltage supply line and the second power voltage supply line.

16. The light emitting display apparatus of claim 14, further comprising:

a scanning driver configured to provide the scan signal; and a data driver configured to provide the data signal.

17. The light emitting display apparatus of claim 16:

wherein the threshold voltage compensating unit is configured to:

store the second power voltage in a compensation capacitor in response to an initialization control signal generated before a activation period of the scan signal;

charge the compensation capacitor up to the threshold voltage of the data driver; and provide the data signal to the data driver via the compensation capacitor; and wherein the scanning driver is configured to provide the initialization control signal.

18. The light emitting display apparatus of claim 14, wherein the light emitting unit comprises an organic light emitting diode (OLED).

19. A method of driving a light emitting display apparatus comprising a plurality of pixel circuits, each pixel circuit comprising a light emitting device, a driving transistor configured to provide a light emitting input signal to the light emitting device based on a magnitude of a data signal, the driving transistor configured to be driven by a first power voltage from a first power voltage supply line, a compensation capacitor having a first terminal coupled to a second power voltage supply line via a switching device and a second terminal coupled to a gate terminal of the driving transistor, a power voltage compensating unit that is separate from the switching device and that is coupled to the first power voltage supply line and the second power voltage supply line, and a storage capacitor having a first terminal coupled to the second terminal of the compensation capacitor, and a second terminal directly coupled to both the first power voltage supply line and the second power voltage supply line, wherein the compensation capacitor is configured to compensate for a threshold voltage of the driving transistor, the method comprising:

charging the compensation capacitor to a level of the threshold voltage of the driving transistor by applying a second power voltage from the second power voltage to the compensation capacitor via the switching device;

compensating for the threshold voltage of the driving transistor, wherein the data signal is provided to a gate electrode of the driving transistor via the compensation capacitor;

providing the light emitting input signal, from the driving transistor, to the light emitting device; and electrically connecting the first power voltage supply line and the second power voltage supply line via the power voltage compensating unit.

20. The method of claim 19, further comprising coupling the gate electrode of the driving transistor to a first electrode of the driving transistor while charging the compensation capacitor.

21. The method of claim 19, wherein the light emitting device is an organic light emitting diode (OLED).

* * * * *